US009081837B2

(12) United States Patent
Novik et al.

(10) Patent No.: US 9,081,837 B2
(45) Date of Patent: Jul. 14, 2015

(54) SCOPED DATABASE CONNECTIONS (75) Inventors: Lev Novik, Bellevue, WA (US); Jason D. Clark, Woodinville, WA (US); Marc T. Friedman, Seattle, WA (US); Andrew Kimball, Sammamish, WA (US); Cihangir Biyikoglu, Issaquah, WA (US); Joachim Hammer, Redmond, WA (US); Tobias Joakim Bertil Ternström, Kirland, WA (US); Ajay Kalhan, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 774 days.

(21) Appl. No.: 13/165,511

(22) Filed: Jun. 21, 2011

(65) Prior Publication Data

US 2012/0109926 A1 May 3, 2012

Related U.S. Application Data (60) Provisional application No. 61/407,796, filed on Oct. 28, 2010.

(51) Int. Cl.
*G06F 17/30* (2006.01)
(52) U.S. Cl.
CPC .................... *G06F 17/30566* (2013.01)
(58) Field of Classification Search
CPC ............ G06F 17/30386; G06F 17/30454; G06F 17/30442; G06F 17/30545; G06F 17/30595; G06F 17/30566
USPC .................. 707/705, 713, 737, 754, 769, 770
See application file for complete search history.

(56) References Cited

U.S. PATENT DOCUMENTS

| 4,853,843 | A  | * | 8/1989 | Ecklund ................. 707/999.1 |
| 6,748,393 | B1 |   | 6/2004 | Kapoor |
| 7,792,878 | B2 |   | 9/2010 | Dettinger |
| 2005/0097099 | A1 | * | 5/2005 | Kapoor et al. .............. 707/3 |
| 2006/0101013 | A1 | * | 5/2006 | Kenney et al. ............. 707/4 |
| 2007/0282856 | A1 |   | 12/2007 | Mueller |

(Continued)

OTHER PUBLICATIONS

Chong, Frederick, et al., "Multi-Tenant Data Architecture", Jun. 2006, 19 pages.
MSDN.Microsoft.com, "Building a Scalable, Multi-Tenant Application for Windows Azure", Based on information and belief available, at least as early as Nov. 2, 2010, 27 pages.

(Continued)

*Primary Examiner* — Hares Jami
(74) *Attorney, Agent, or Firm* — Aneesh Mehta; Stein Dolan; Micky Minhas (57) ABSTRACT

The present invention extends to methods, systems, and computer program products for scoping the context used to access a database partition. Embodiments of the invention enable data isolation using partitions in multi-tenant databases, while relieving client applications from dealing with the partitions. For example, a computer system that includes a distributed database system comprising a plurality of database partitions in a federation receives a context to use when performing database access operations within the distributed database system. The context identifies specified relevant portion of the federation. The computer system also receives a database access operation that is associated with the context. The computer system modifies the semantics of the database access operation in accordance with the associated context, to direct application of the database access operation to the specified relevant portion of the federation.

20 Claims, 3 Drawing Sheets

(56) References Cited

U.S. PATENT DOCUMENTS

2009/0049056 A1    2/2009   Shutt
2010/0030995 A1*   2/2010   Wang et al. .................. 711/173

OTHER PUBLICATIONS

Satoh, Ichiro, "Dynamic Federation of Partitioned Applications in Ubiquitous Computing Environments", 2004, 5 pages.

* cited by examiner

SCOPED DATABASE CONNECTIONS

CROSS-REFERENCE TO RELATED APPLICATIONS

This application claims the benefit of U.S. Provisional Patent Application No. 61/407,796, entitled "SCOPED DATABASE CONNECTIONS", filed on Oct. 28, 2010, which is incorporated herein in its entirety.

BACKGROUND

1. Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing environments.

In some computing environments, databases are used to manage sets of data for one or more database tenants (e.g., users, organizations, etc.). When managing data for multiple tenants, an isolation boundary can be used to separate data for different database tenants and to promote security.

Often isolation boundaries are formed by using a separate database per tenant. For example, data from one user can be separated from data for all other users by storing that user's data in a separate database. However, some applications manage a very large number of tenants. For example, social networking sites can have hundreds of millions of users. Maintaining a separate database per tenant (user) can become cumbersome and resource intensive.

In some environments, isolation boundaries are formed by sharding. Sharding is a form of horizontal partitioning that splits (partitions) one or more tables by dividing different rows into different tables. Horizontal partitioning reduces the total number of rows in each table, reducing index size across a single instance of a schema (or same logical server). Sharding goes further by splitting (partitioning) one or more tables across multiple servers (logical or physical). As such, sharding enables distribution of a larger database over multiple machines, improving performance. Sharding is, however, difficult to implement, and typically requires hand-coding and complex coordination between the application layer and the database layer.

Whatever the isolation scheme is used, data isolation may alter the arrangement of data in a database or in database partitions, either while the database is online or offline. As such, the location of data sets may change within the database environment, even though the underlying data may remain the same. Consequently, a given database query may return differing results at different times based on a current arrangement of data, even though the data has not changed.

BRIEF SUMMARY

The present invention extends to methods, systems, and computer program products for scoping database connections within federated databases. In some embodiments, a computer system receives a context to use when performing database access operations within a distributed database system. The context identifies a specified relevant portion of a federation of the distributed database system. The computer system also receives a database access operation that is associated with the context. The computer system modifies the semantics of the database access operation in accordance with the associated context, to direct application of the database access operation to the specified relevant portion of the federation.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

The present invention extends to methods, systems, and computer program products for scoping database connections within federated databases. In some embodiments, a computer system receives a context to use when performing database access operations within a distributed database system. The context identifies a specified relevant portion of a federation of the distributed database system. The computer system also receives a database access operation that is associated with the context. The computer system modifies the semantics of the database access operation in accordance with the associated context, to direct application of the database access operation to the specified relevant portion of the federation.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Generally, scoped connections are used to automatically filter operations on their queries down to a specific database tenant without applications having to do extra work to filter the operations. This type of connection makes it easy to house multiple tenants in a single federation member (physical database) while ensuring consistency of operations when the arrangements data within the federation member may change.

Embodiments of the invention include the use of database federations which can be used, among other things, for data isolation. A database federation is a collection of one or more federation members, which each represent database partitions that can be stored separately. Federation members are defined according to a federation scheme and include one or more federated (or distributed) data tables that are federated on a common federation key (e.g., a column such as federation_key, tenant_id, etc.). As such, each federation member can include a set of rows of the one or more federated data tables having a value for the federation key within a defined distribution. A database federation can thereby include one or more federation members that each includes a portion of one or more federated tables, based on a corresponding range of values for the federation key.

The federation scheme defines one or more of: the federation key(s), their data type(s), and the distribution data (e.g., range, hash, round robin) for each federation member. Each federation can have its own federation scheme. Federation members can be visible in an application model and be identified through their federation key distributions and, in some embodiments, a member name.

Each federation member can comprise one or more federation units. Federation units are collections of rows of the one or more federated data tables which have a common value for the federation key. In some embodiments, a federation unit may correspond to an individual database tenant, and the federation key may be used to identify the tenant using a tenant identifier (e.g., tenant_id=55). Thus, a federation unit can be a part of a federation member by virtue having a federation key value within the federation member's federation key range or distribution. A federation unit is typically atomic, such that it is indivisible.

Federations can be created in any database. There can be many federations in a database, each federation representing a separate collection of tables such as 'all customer data' or 'all order data', and each federation member can contain a subset of the full dataset. It is also possible, however, for a single federation member to contain the whole of the collection of tables.

In addition to containing rows from partitioned or federated tables, federation members may also contain regular (non-federated) tables whose rows are fully contained within the member. Non-federated tables can contain reference data which is retrieved in combination with the partitioned data (e.g., product information (reference data) and products sales (federated by sales date)).

Federation members can be physically separated from one another (e.g., running at different machines, stored in separate storage). As such, data at one federation member can also be physically separated from data at other federation members.

The schemas for federated and non-federated tables in one federation member may differ from the schemas of tables in other federation members. Schema divergence can be temporary, e.g., to accommodate a new schema version roll-out across a subset of members in a federation, and until federation members eventually converge on the same schema.

A federation can include a root database, which represents an application boundary of the federation. The root database is the "landing pad" or logical endpoint for applications connected to a federation. A root database can contain one or more named federations, each with its own federation scheme defining the federation key. A root database can also contain global data including: application defined (configuration) data, users and passwords, and roles. A root database can also contain versioning information for the federation members or provide distributed query processing abilities.

A federation can also define the distribution policy and the data type to use for the distribution of data. With the introduction of a federation concept and first class server side statement for copying of data online between physical databases, new type of cloud, web, and multi tenant solutions can be more easily developed. With scoped connections, applications can connect to federation member using a single connection and only see parts of federated tables that contain the value.

Figure 1A:
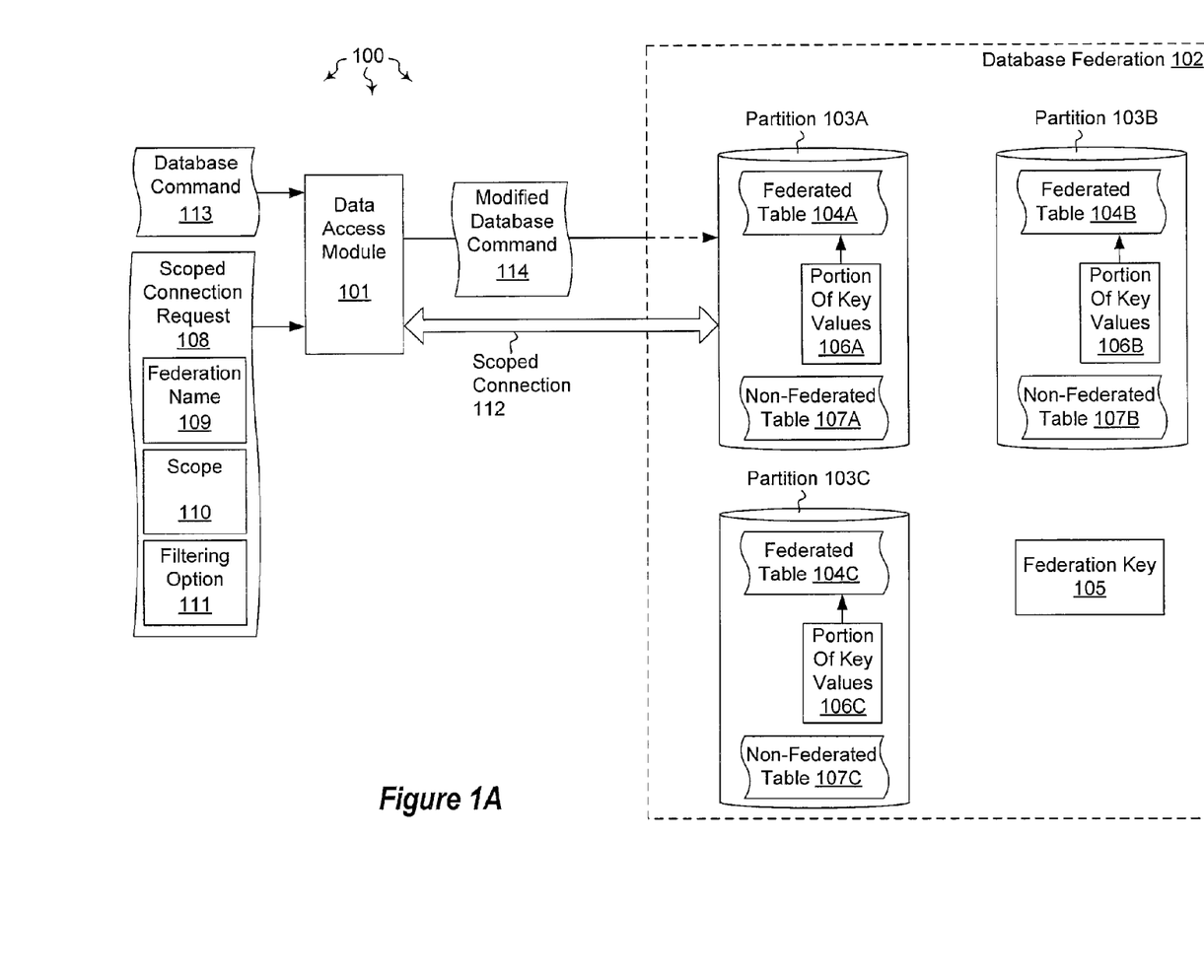
FIG. 1A illustrates an example computer architecture that facilitates scoping database connections.
Figure 1B:
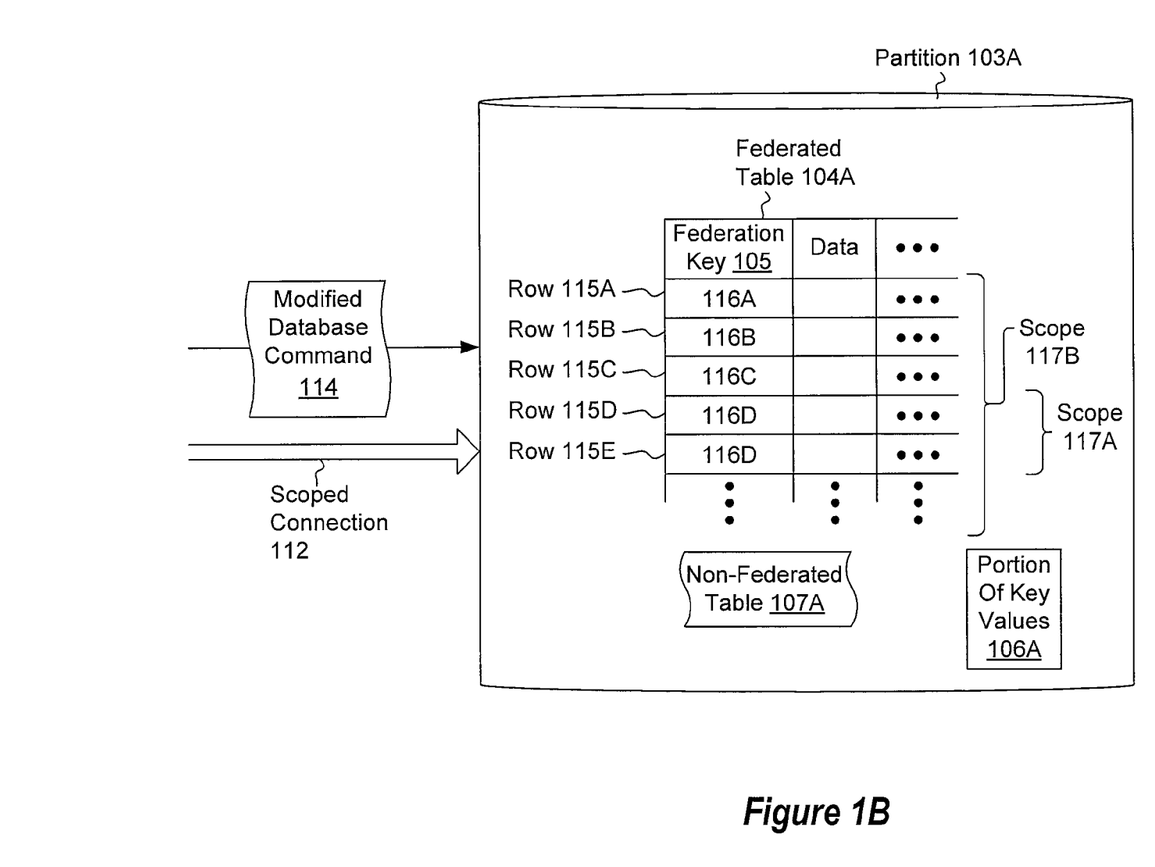
FIG. 1B illustrates an example computer architecture that facilitates scoping database connections.

Along these lines, FIGS. 1A and 1B illustrate an example computer architecture 100 that facilitates scoped database connections. Referring to FIG. 1A, computer architecture 100 includes data access module 101 and database federation 102. Each of the depicted components is connected to one another over (or is part of) a network, such as, for example, a Local Area Network ("LAN"), a Wide Area Network ("WAN"), and even the Internet. Accordingly, each of the depicted components as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

As illustrated, database federation 102 includes partitions (i.e., federation members) 103A, 103B, and 103C that distribute rows of an original data table (not shown) over federated tables 104A, 104B, and 104C based on a federation key 105 corresponding to a column of the original data table. Rows of the original data table are distributed over the federated tables (104A, 104B, and 104C) based on values for the column and a portion of key values (106A, 106B, and 106C) assigned to each partition. For example, partition 103A includes federated table 104A that stores rows of the original data table having values for the federation key 105 within the portion of key values 106A. Likewise, partitions 103B and 103C include federated tables 104B and 104C that each store rows of the original data table having values for the federation key 105 within the portion of key values 106B and 106C, respectively.

Each portion of key values 106A, 106B, and 106C can define subsets of federation key values using an appropriate data distribution technique. For example, each portion of key values can define a contiguous range of federation key values (e.g., rows having values 1-10 for the federation key 105 belong to partition 103A, rows having values 11-20 for the federation key 105 belong to partition 103B, etc.). However, other mechanisms for allocating responsibility for key value subsets and key values within a key value subset need not be contiguous (e.g., hash, round robin).

Partitions can optionally include one or more non-federated data tables (e.g., non-federated tables 107A, 107B, and 107C) that are completely contained within the corresponding partition. Non-federated tables can store reference data or other types of non-federated data, which can be accessed in connection with federated data.

While FIG. 1A illustrates only one database federation 102, a database can include any number of database federations. Furthermore, while the database federation 102 is shown as having only one federation key 105, database federations can include any number of federation keys, with corresponding partitions. Also, while three partitions are shown in connection with federation key 105, one will appreciate in view of the disclosure herein that database federation can include any number of partitions, including a single partition. Finally, while each partition is shown as storing only a single federated table, each representing a portion of a single original data table, each partition can store a plurality of federated tables corresponding to a plurality of original data tables. In this case, each of the plurality of data tables are associated by including a common column corresponding to the federation key 105.

Each of the partitions 103A, 103B, and 103C can be stored at a separate storage location (e.g., separate physical machines, separate data stores, etc.). Thus, using the database federation 102, a database operator can distribute and partition the original data table to a plurality of separated locations, thereby facilitating data isolation. While the partitions may be separately stored, the partitions are presented to a client application as a single unit through the database federation 102.

Database federation 102 can be formed through a series of commands. For example, a partition module (not shown) can issue a create command to create database federation 102 having federation name 109. Upon creation of database federation 102, a single partition covering all values for a given federation key can be created. Thus, the single partition would include all rows of the original data table. Subsequently, through other database federation operations (e.g., split operations and/or merge operations), the single partition can be divided into partitions 103A, 103B, and 103C and the original data table can be "federated" into federated data tables 104A, 104B, and 104C. The original partition can then be removed from the database federation 102.

The data access module 101 is configured to provide access to data stored in the partitions. In particular, the data access module 101 is configured to provide a scoped connection to the particular partition containing the requested data. Scoping the connection ensures that subsequent split and merge operations will not affect the results of a database command, because commands executed over a scoped connection operate on the same rows of data regardless of their arrangement within the database federation 102.

The data access module 101 is configured to initially receive a scoped connection request 108 that includes a federation name 109 of the requested database federation 102, a scope 110, and a filtering option 111. The scope 110 can be a federation key value that is within the range of one of the federated tables 104A, 104B, or 104C. Upon identification of the appropriate federated table, the data access module 101 can be configured to establish a scoped connection to the corresponding partition. For example, scope 110 can be a value in the portion of federation key values 106A of federated table 104A. As such, a scoped connection 112 can be established between data access module 101 and partition 103A.

The data access module 101 is also configured to modify database commands that connect to partition 103A via the scoped connection 112, and to interact with data within scope 110 (e.g., data for a specified federation key value contained in federated table 104A). For example, data access module 101 can be configured to transform database command 113 into modified database command 114 so that the modified database command 114 is directed to partition 103A through connection 112. Then, depending on the value of filtering option 111, the modified database command 114 interacts with rows within the federated table 104A generally, or only within rows matching the scope 114. In some embodiments, the database commands 113, 114 can comprise a Structured Query Language (SQL) commands.

Connections to federation members can be established in a number of ways. In some embodiments, a scoped connection request can be in the following format:

USE FEDERATION federation_name (federation_key_value)

WITH FILTERING={ON|OFF}, RESET wherein:
federation_name is the name of the target federation for the connection.
federation_key_value defines the scope of the connection and comprises the federation key value for connecting to a partition. The partition servicing the federation key value becomes the partition to which the connection is established. The value should generally comply with the type of federation key values used by the database federation specified by federation_name, and should not be NULL.
WITH FILTERING={ON|OFF} defines the behavior of the defined scope.
WITH RESET makes the connection reset explicit, when defined.

A "USE FEDERATION federation_name (federation_key_value)" statement with FILTERING=ON facilitates establishing a scoped connection 112 with a corresponding partition that limits database commands to a specific federation unit (i.e., rows having the same value for the federation key) within the partition, rather than the full range of rows stored in the partition. That is, for the duration of the scoped connection 112, the Data Manipulation Language (DML), such as SQL, is scoped only to rows within the corresponding federated table that contain the federation key value specified. This can be accomplished by the data access module 101 adding a predicate (e.g., "PartitionKey=@value") on the federation key column to every query that refers to the federated table. In the case of "UPDATE" and "INSERT" commands, operations outside of the scope may generate an exception. For "SELECT" and "DELETE" commands, operations with scope outside of the federation key value return no values or have no effect.

A "USE FEDERATION federation_name (federation_key_value)" statement with FILTERING=OFF facilitates connecting to the full range of rows stored by a partition that contains the specific federation key value. This connection type is typically reserved for Data Definition Language (DDL) commands for defining data structures and for queries requiring the largest possible scope (e.g., fan-out queries selecting all the data in the federation). Filtering to a partition can be accomplished by the data access module 101 adding a predicate (e.g., "range_low [<|<=] PartitionKey [<|<=range_high") to every query that refers to the federated table. Optionally, a connection may be established to a partition directly using a partition name, instead of federation key value.

Turning now to FIG. 1B, an exemplary federated table 104A can include rows 115A-115E. As shown, federated table 104A can include a column corresponding the federation key 105 (e.g., federation_key, tenant_id, etc.). Each of rows 115A can include a corresponding federation key value 116A-116D that is within the portion of key values 106A for the partition. While, in some embodiments, the federation key values 116-A-116D can each be unique values within the portion of key values 106A, in other embodiments at least some of the key values can be the same. For example, rows 115D and 115E are illustrated as sharing the same federation key value, 116D. In some embodiments, this may indicate that the data in rows 115D and 115E correspond to a common database tenant, for example.

When connecting to partition 103A using FILTERING=ON, the scope of the connection is limited to only those rows corresponding to the specified key value. For example, scope 117A shows that the scope of the connection 112 established using key value 116D and FILTERING=ON includes only rows 115D and 115E. The modified database command 114 can thus act on rows 115D and 115E only. The scope of a connection can include as few as one row when the specified key value is unique to a row, or can include a plurality of rows (up to and including all rows in the federated table) when the specified key value is shared by the plurality of rows.

By contrast, when connecting to partition 103A using FILTERING=OFF the scope of the connection is the scope of all the rows in the partition, as indicated by scope 117B. Thus, regardless of the federation key value 116A-116D specified in the scope 110 of the connection request 108, the connection 112 is scoped to the entire federated data table 104A, and the modified database command 114 can act on all of the rows of the table (i.e., rows 115A-115E).

Figure 2:
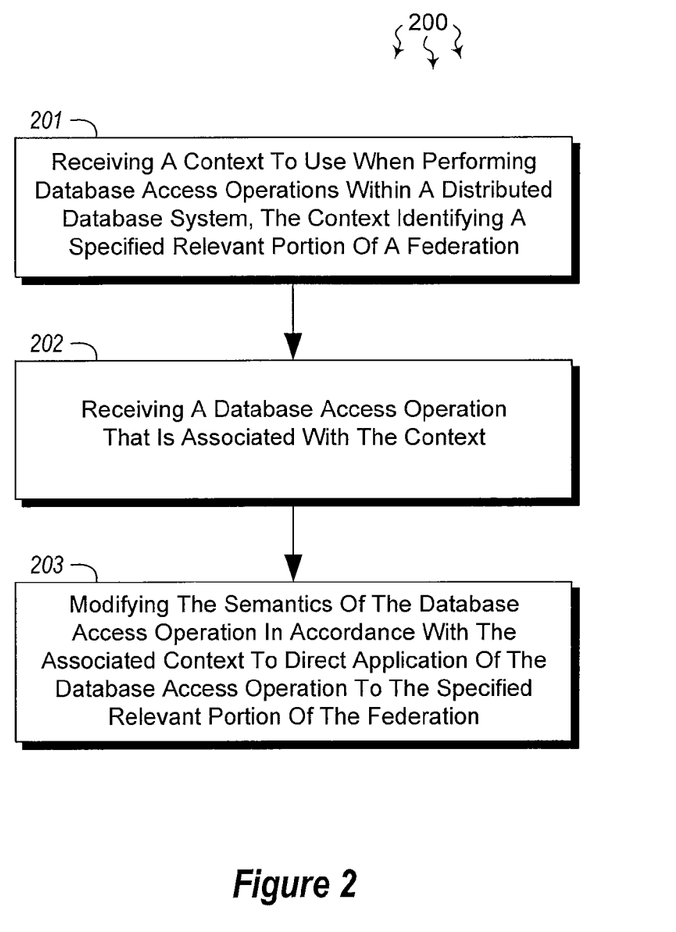
FIG. 2 illustrates a flow chart of an example method for scoping the context used to access a database partition.

FIG. 2 illustrates a flow chart of an example method 200 for scoping the context used to access a database partition. Method 200 will be described with respect to the components and data of computer architecture 100.

Method 200 includes an act of receiving a context to use when performing database access operations within a distributed database system, the context identifying a specified relevant portion of a federation (act 201). For example, data access module 101 can receive scoped connection request 108. Scoped connection request 108 can include a scope 110 identifying a partition (e.g., one of partitions 103A, 103B, or 103C) to connect to. Scoped connection request 108 can also include a federation name 109 of the requested database federation (e.g., database federation 102) and/or a filtering option 111. The scope 110 can comprise a value for a federation key column in a federated table (e.g., one of federated tables 104A, 104B, or 104C) corresponding to a federation key 105. Based on the value and a portion of key values (e.g., portion of key values 106A, 106B, and 106C) associated with each partition, the data access module 101 can determine which partition to connect to. For instance, data access module 101 can determine that scope 110 identifies a key value within portion of key values 106A corresponding to partition 103A, and establish scoped connection 112 with partition 103A.

Method 200 further includes an act of receiving a database access operation that is associated with the context (act 202). For example, subsequent to receiving scoped connection request 108 and establishing scoped connection 112, data access module 101 can receive database command 113 associated with the connection request 108. Database command 113 can comprise any appropriate data access operation, including DML commands such as UPDATE, INSERT, SELECT, DELETE, and/or DDL commands.

Method 200 also includes as act of modifying the semantics of the database access operation in accordance with the associated context to direct application of the database access operation to the specified relevant portion of the federation (act 203). For example, data access module 101 can modify database command 113 to create modified database command 114 that executes within scoped connection 112. The nature of the modification can depend, at least in part, on a filtering option 111 included in the scoped connection request.

When the filtering option 111 is ON (e.g., FILTERING=ON), the modified database command 114 can execute only on rows within data tables of the connected partition identified by the scope 110. In the illustrated case, for example, if the scope 110 defines key value 116D, the modified database command 114 can only execute on or access rows 115D and 115E of federated table 104A in partition 103 (as indicated by scope 117A). Similarly, if the scope 110 were to define a different key value (e.g., 116A), then the modified database command 114 would execute on or access only corresponding different rows (e.g., 115A) of the federated table 104A. The scoping can be accomplished via the addition of a predicate, such as "fed_column=value", "PartitionKey=@value", and the like.

When the filtering option 111 is OFF (e.g., FILTERING=OFF), the modified database command 114 can execute on any rows in the within federated tables of the connected partition identified by the scope 110. For instance, as indicated by scope 117B, the modified database command 114 would execute on any of the rows in federated table 104A, regardless of the specific value of scope 110, so long as the scope 110 identifies one of keys 116A-116D.

As indicated previously, a federation can include a root database, which represents an application boundary of a federation and which contains one or more named federations, among other things. In some embodiments, the USE FEDERATION statement can be used to connect to the root database, using the following format:

USE FEDERATION ROOT WITH RESET which points the existing connection at the federation root. When run in a partition, the connection is reset back to the federation root database. When run in any other database, it results in a "noop".

The USE FEDERATION statement can also provide efficient connection pooling behavior for connectivity libraries by allowing applications to first connect to that database that contains a federation object, and through the USE FEDERATION statement, switch to the specific partition. This helps ensure that the client connection pool maintains a smaller pool than it would if it had to address individual partitions (federation members) or federation unit values.

USE FEDERATION can typically be executed on a connection at any point in the lifetime of the connection. USE FEDERATION can rewire a connection from the current partition or the root database to the federation root or to the specified key value that is contained within a partition. When a connection is rewired with USE FEDERATION, the connection can be reestablished.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a distributed database system including one or more processors and system memory, the distributed database system also including a plurality of database partitions in a federation, the federation configured to store a plurality of rows of data, each row of data identified by a federation key value, such that the federation stores data for a set of federation key values, each of the plurality of database partitions configured to physically store any rows of data having a federation key value within a specified portion of federation key values in the set, a method for scoping the context used to access a database partition, the method comprising:

receiving a context to use when performing database access operations within the distributed database system, the context identifying a specified relevant portion of the federation, the context having been provided by a command which includes each of a federation name corresponding to a requested database federation of the distributed database system, a scope comprising a federation key value, and a filtering option;

based on the received context, establishing a scoped connection to the distributed database system;

receiving a database access operation that is associated with the context; and modifying the semantics of the database access operation in accordance with the associated context to direct application of the database access operation to the specified relevant portion of the federation; and sending the modified database access operation to the distributed database system through the scoped connection.

2. The method as recited in claim 1, wherein receiving a context to use when performing database access operations comprises an act of receiving a context identifying a relevant database partition within the federation.

3. The method as recited in claim 2, wherein modifying the semantics of the database access operation in accordance with the context comprises an act of modifying the semantics of the database access operation to direct application of the database access operation to the relevant database partition.

4. The method as recited in claim 2, wherein receiving a context to use when performing database access operations comprises an act of receiving a context that includes a specified value contained in the relevant database partition.

5. The method as recited in claim 4, wherein modifying the semantics of the database access operation in accordance with the context comprises an act of modifying the semantics of the database access operation to direct application of the database access operation to rows having the specified value.

6. The method as recited in claim 1, wherein receiving a database access operation comprises an act of receiving a SQL command.

7. The method as recited in claim 1, wherein receiving a database access operation comprises an act of receiving a query for one or more rows of data stored in the federation.

8. The method as recited in claim 1, further comprising an act of receiving a filtering option.

9. The method as recited in claim 8, further comprising turning filtering on, and wherein modifying the semantics of the database access operation comprises an act of modifying the semantics of the database access operation to access only rows within the specified relevant portion of the federation that correspond to a particular federation key value.

10. The method as recited in claim 8, wherein the filtering option comprises turning filtering off, modifying the semantics of the database access operation comprising an act of modifying the semantics of the database access operation to access the entire specified relevant portion of the federation, including rows within the specified relevant portion of the federation that correspond to a particular federation key value as well as other rows within the specified relevant portion of the federation.

11. A computer program product for use at a computer system that includes a plurality of database partitions in a federation, the federation configured to store a plurality of rows of data, each row of data identified by a federation key value, such that the federation stores data for a set of federation key values, each of the plurality of database partitions configured to physically store any rows of data having a federation key value within a specified portion of federation key values in the set, the computer program product for implementing a method for scoping the context used to access a database partition, the computer program product comprising one or more computer hardware storage devices having stored thereon computer-executable instructions that, when executed at a processor, cause the computer system to perform the method, including the following:

receiving a context to use when performing database access operations within the distributed database system, the context identifying a specified relevant portion of the federation, the context having been provided by a command which includes each of a federation name corresponding to a requested database federation of the distributed database system, a scope comprising a federation key value, and a filtering option;

based on the received context, establishing a scoped connection to the distributed database system;

receiving a database access operation that is associated with the context;

modifying the semantics of the database access operation in accordance with the associated context to direct application of the database access operation to the specified relevant portion of the federation; and sending the modified database access operation to the distributed database system through the scoped connection.

12. The computer program product as recited in claim 11, wherein receiving a context to use when performing database access operations comprises receiving a context identifying a relevant database partition within the federation.

13. The computer program product as recited in claim 12, wherein modifying the semantics of the database access operation in accordance with the context comprises modifying the semantics of the database access operation to direct application of the database access operation to the relevant database partition.

14. The computer program product as recited in claim 12, wherein receiving a context to use when performing database access operations comprises receiving a context that includes a specified value contained in the relevant database partition.

15. The computer program product as recited in claim 14, wherein modifying the semantics of the database access operation in accordance with the context comprises modifying the semantics of the database access operation to direct application of the database access operation to rows having the specified value.

16. The computer program product as recited in claim 11, wherein receiving a database access operation comprises receiving a query for one or more rows of data stored in the federation.

17. The computer program product as recited in claim 11, further comprising an act of receiving a filtering option.

18. The computer program product as recited in claim 17, wherein the filtering option comprises turning filtering on, modifying the semantics of the database access operation comprising modifying the semantics of the database access operation to access only rows within the specified relevant portion of the federation that correspond to a particular federation key value.

19. The computer program product as recited in claim 17, wherein the filtering option comprises turning filtering off, modifying the semantics of the database access operation comprising modifying the semantics of the database access operation to access the entire specified relevant portion of the federation, including rows within the specified relevant portion of the federation that correspond to a particular federation key value as well as other rows within the specified relevant portion of the federation.

20. A computer system, the computer system comprising:
one or more processors;
system memory; and
one or more computer storage devices having stored thereon computer executable instructions that, when executed by the one or more processors, cause the computer system to perform a method for scoping the context used to access a database partition, including the following:
  receiving a scoped connection request to connect to a distributed database system, the scoped connection request comprising a command which includes each of:
    a federation name corresponding to a requested database federation of the distributed database system;
    a scope comprising a federation key value, the scope used when performing database access operations within the distributed database system, the scope identifying a federated partition within the distributed database system using the federation key value; and
    a filtering option, the filtering option indicating whether to limit connection scope to only particular rows of the federated partition corresponding to the federation key value when the filtering option is on, or whether to limit connection scope to all rows of the federated partition generally when the filtering option is off;
  based on the scoped connection request, establishing a scoped connection to the distributed database system;
  receiving a database access operation that is associated with the scope connection request;
  modifying the semantics of the database access operation in accordance with the associated scope and the filtering option, to direct application of the database access operation to the particular rows of the federated partition when the filtering option is on, or to all rows of the federated partition generally when the filtering option is off; and
  sending the modified database access operation to the distributed database system through the scoped connection.

* * * * *